(12) United States Patent
Higashiyama et al.

(10) Patent No.: US 8,476,353 B2
(45) Date of Patent: *Jul. 2, 2013

(54) AMORPHOUS POLYAMIDE RESIN COMPOSITION AND MOLDED PRODUCT

(75) Inventors: Hideyuki Higashiyama, Tokyo (JP); Keiji Sekine, Tokyo (JP)

(73) Assignee: Asahi Fiber Glass Company, Limited, Tokyo (JP)

(*) Notice: Subject to any disclaimer, the term of this patent is extended or adjusted under 35 U.S.C. 154(b) by 876 days.

This patent is subject to a terminal disclaimer.

(21) Appl. No.: 12/284,835

(22) Filed: Sep. 25, 2008

(65) Prior Publication Data

US 2010/0076155 A1    Mar. 25, 2010

(51) Int. Cl.
  C08K 3/34    (2006.01)
  C08K 3/40    (2006.01)
  C03C 3/078   (2006.01)
  C03C 3/087   (2006.01)
  C03C 3/093   (2006.01)

(52) U.S. Cl.
  USPC ............. 524/494; 524/492; 524/493; 501/33; 501/35; 501/36; 501/37; 501/53; 501/55; 501/65; 501/66; 501/68; 501/72; 501/153; 501/154; 501/903

(58) Field of Classification Search
  USPC .................. 501/33, 35, 36, 37, 53, 55, 65, 66, 501/68, 72, 153, 154, 903; 524/492, 493, 524/494
  See application file for complete search history.

(56) References Cited

U.S. PATENT DOCUMENTS

| 4,768,859 | A  | * | 9/1988  | Kasori et al. ................. 385/144 |
| 7,144,633 | B2 | * | 12/2006 | Zguris et al. ................. 428/432 |
| 2003/0176560 | A1 | * | 9/2003 | Mueller et al. ............... 524/494 |
| 2009/0171038 | A1 | * | 7/2009 | Steffner ....................... 525/435 |

FOREIGN PATENT DOCUMENTS

| JP | 04-337355 A | 11/1992 |
| JP | 07-053862 A | 2/1995 |
| JP | 2000-226228 A | 8/2000 |
| JP | 2005-277187 A | 10/2005 |
| JP | 2006169324 A * | 6/2006 |
| WO | WO 02/31053 A | 4/2002 |
| WO | WO 2007074086 A1 * | 7/2007 |

OTHER PUBLICATIONS

Derwent Acc No. 1993-011665 (1993) Abstract of JP 04-337355, submitted by applicant.*
Machine Translation of JP 2006-169324 (Jun. 29, 2006).*
Database WPI Week 200710, Thomson Scientific, London, GB; AN 2007-094977, XP002512964 & JP 2006 312706 A (Asahi Fiberglass KK) (Nov. 16, 2006).
Extended European Search Report dated Feb. 10, 2009 in a corresponding European application (6 pages).
U.S. Appl. No. 12/286,057, filed Sep. 26, 2008, Confirmation No. 1933.

* cited by examiner

Primary Examiner — Ling Choi
Assistant Examiner — Darcy D. LaClair Lynx
(74) Attorney, Agent, or Firm — Holtz Holtz Goodman & Chick PC

(57) ABSTRACT

Provided are an amorphous polyamide resin composition having high transparency, and is excellent in heat resistance and stiffness, and a molded product thereof. The glass filler contains, expressed in terms of oxides by mass %, 68 to 74% of silicon dioxide ($SiO_2$), 2 to 5% of aluminum oxide ($Al_2O_3$), 2 to 5% of boron oxide ($B_2O_3$), 2 to 10% of calcium oxide (CaO), 0 to 5% of zinc oxide (ZnO), 0 to 5% of strontium oxide (SrO), 0 to 1% of barium oxide (BaO), 1 to 5% of magnesium oxide (MgO), 0 to 5% of lithium oxide ($Li_2O$), 5 to 12% of sodium oxide ($Na_2O$), and 0 to 10% of potassium oxide ($K_2O$), where a total amount of lithium oxide ($Li_2O$), sodium oxide ($Na_2O$), and potassium oxide ($K_2O$) is 8 to 12%.

12 Claims, No Drawings

AMORPHOUS POLYAMIDE RESIN COMPOSITION AND MOLDED PRODUCT

BACKGROUND OF THE INVENTION

1. Field of the Invention

The present invention relates to an amorphous polyamide resin composition that is excellent in transparency, heat resistance, and stiffness and a molded product thereof.

2. Description of the Related Art

Conventionally, transparent resins are used as materials for molded products required to have usual transparency, such as automotive parts, lightning equipment, and electrical parts. In recent years, particularly, the range of applications of the resins as optical materials required to have excellent optical properties has been extended. In particular, an amorphous polyamide resin derived from a structure with polymerized monomers has low birefringence and high transparency, and hence the resin is used as a transparent resin for optical materials, and the like.

However, the amorphous polyamide resin has low stiffness. Therefore, attempts to improve the stiffness of the amorphous polyamide resin molded product have been made by addition of a fiber reinforcing material such as a glass fiber, an inorganic filler, a rubber component, or the like.

For example, Japanese Patent Application Laid-open No. Hei 4-337355 discloses an amorphous polyamide resin composition produced by blending a glass filler such as a glass fiber in an amorphous polyamide resin composition containing a transparent polyamide resin and a styrene-butadiene copolymer.

On the other hand, Japanese Patent Application Laid-open No. Hei 7-53862 discloses a polyamide resin composition including: 100 parts by weight of a mixture of an aliphatic crystalline polyamide resin (60 to 90% by weight), a semi-aromatic amorphous polyamide resin (0 to 20% by weight), and a phenol resin (5 to 30% by weight); and 50 to 200 parts by weight of a glass fiber.

Conventionally, a glass filler called E-glass or S-glass has been mainly used as reinforcing materials for polyamide resins in general.

However, the refractive index of the amorphous polyamide resins with respect to light having a wavelength of 589 nm (nD) is 1.50 to 1.54, while the refractive index of E-glass is about 1.555. Therefore, an amorphous polyamide resin molded product reinforced with E-glass has improved strength but has lowered transparency because of difference between the refractive indices. In addition, the refractive index of S-glass is about 1.521. In the case where there is no difference of the refractive indices between the S-glass and the amorphous polyamide resin, the transparency of an S-glass reinforced amorphous polyamide resin molded product is not impaired, but the melting temperature of S-glass is very high (about 1,800° C.), resulting in difficulty in producing a glass fiber.

In Japanese Patent Application Laid-open No. Hei 4-337355, the amorphous polyamide resin is reinforced with a glass fiber including E-glass, and hence a molded product of the amorphous polyamide resin has a total light transmittance of 56 to 71%, and has low transparency.

In Japanese Patent Application Laid-open No. Hei 7-53862, glass fiber is blended in an amorphous polyamide resin to improve the stiffness and mechanical strength, but is not considered about the transparency, and hence an attempt to adjust the refractive indices of the amorphous polyamide resin and the glass fiber by changing the composition of the glass fiber is not disclosed.

SUMMARY OF THE INVENTION

Therefore, an object of the present invention is to provide an amorphous polyamide resin composition having high transparency, and is excellent in heat resistance and stiffness, and a molded product thereof.

As a result of extensive studies to achieve the above-mentioned object, the inventors of the present invention have found out that an amorphous polyamide resin composition having high transparency, and is excellent in heat resistance and stiffness can be produced by blending a glass filler having a certain glass composition (which is not disclosed in conventional technical data) and a certain amorphous polyamide resin. The present invention has been accomplished based on the novel findings and has the following characteristics.

The amorphous polyamide resin composition of the present invention includes a resin component containing an amorphous polyamide resin and a glass filler, in which the glass filler contains, expressed in terms of oxides by mass %, 68 to 74% of silicon dioxide ($SiO_2$), 2 to 5% of aluminum oxide ($Al_2O_3$), 2 to 5% of boron oxide ($B_2O_3$), 2 to 10% of calcium oxide (CaO), 0 to 5% of zinc oxide (ZnO), 0 to 5% of strontium oxide (SrO), 0 to 1% of barium oxide (BaO), 1 to 5% of magnesium oxide (MgO), 0 to 5% of lithium oxide ($Li_2O$), 5 to 12% of sodium oxide ($Na_2O$), and 0 to 10% of potassium oxide ($K_2O$), where a total amount of lithium oxide ($Li_2O$), sodium oxide ($Na_2O$), and potassium oxide ($K_2O$) is 8 to 12%.

If a glass filler having the above-mentioned composition is added to a resin component containing an amorphous polyamide resin, it is possible to provide an amorphous polyamide resin composition that can be used for producing a molded product having high transparency, and having mechanical strength and heat resistance equivalent to those in the case of a conventional E-glass fiber. The glass filler having the above-mentioned composition has a glass melting temperature equivalent to those of the glass fillers formed of E-glass. Therefore, even in the case of a continuous glass fiber having difficulty in glass molding, the glass fiber can be readily produced.

In the amorphous polyamide resin composition of the present invention, it is preferred that differences of refractive indices between the glass filler and the resin component be: 0.002 or less with respect to light having a wavelength of 589 nm; 0.002 or less with respect to light having a wavelength of 486 nm; and 0.002 or less with respect to light having a wavelength of 656 nm; and that the amorphous polyamide resin composition have a parallel light transmittance of 65% or more and a haze of less than 25% when the composition is molded into a plate having a thickness of 2 mm.

It is preferred that the amorphous polyamide resin composition of the present invention utilize the glass filler having, in its composition, a total content of calcium oxide (CaO) and magnesium oxide (MgO) of 2 to 15% expressed in terms of oxides by mass %.

It is preferred that the amorphous polyamide resin composition of the present invention utilize the glass filler having, in its composition, a total content of silicon dioxide ($SiO_2$) and aluminum oxide ($Al_2O_3$) of 70 to 79% expressed in terms of oxides by mass %.

It is preferred that the amorphous polyamide resin composition of the present invention utilize the glass filler which is, in its composition, substantially free from titanium oxide ($TiO_2$).

It is preferred that the amorphous polyamide resin composition of the present invention have a content of the glass filler of 5 to 40 mass %.

It is preferred that, in the amorphous polyamide resin composition, the glass filler be at least one selected from the group consisting of a glass fiber, a glass powder, a glass flake, a milled fiber, and a glass bead.

Meanwhile, the amorphous polyamide resin molded product of the present invention is characterized by being produced by molding the above-mentioned amorphous polyamide resin composition.

According to the amorphous polyamide resin molded product of the present invention, because a difference of the refractive indices between the amorphous polyamide resin and the glass filler is very small even after reinforcement using the glass filler, there may be obtained a molded product having extremely high transparency.

DETAILED DESCRIPTION OF THE PREFERRED EMBODIMENTS

In the present invention, it is possible to produce an amorphous polyamide resin molded product which is excellent in transparency, mechanical strength, and heat resistance. Therefore, the product can be suitably used as a molded product which is required to have both transparency and strength, such as a display cover of an electrical device or an electronic device or a plate-glass alternative to be used for automobiles or building materials. In addition, the product can be suitably used as a molded product, which is further required to have heat resistance in the above-mentioned field.

(Amorphous Polyamide Resin Composition)

The amorphous polyamide resin composition of the present invention contains a resin component containing an amorphous polyamide resin and contains a glass filler.

In the amorphous polyamide resin composition of the present invention, differences of the refractive indices between the resin component containing the amorphous polyamide resin and the glass filler are preferably: 0.002 or less with respect to light having a wavelength of 589 nm; 0.002 or less with respect to light having a wavelength of 486 nm; and 0.002 or less with respect to light having a wavelength of 656 nm. Each of the differences is more preferably 0.001 or less with respect to the above-mentioned three wavelengths of light. If the each of the differences of the refractive indices between the resin component containing the amorphous polyamide resin and the glass filler exceeds 0.002 with respect to the above-mentioned three wavelengths of light, a molded product produced by molding the amorphous polyamide resin composition has low transparency, which is not preferred.

Next, the components of the amorphous polyamide resin composition of the present invention are described.

(Resin Component)

The resin component containing an amorphous polyamide resin to be used for the amorphous polyamide resin composition of the present invention is not particularly limited as long as the component contains an amorphous polyamide resin having transparency. From materials that constitute polyamide resins, by selecting a material monomer having an asymmetric chemical structure, the amorphous polyamide resin having transparency can be obtained. In addition, the resin component containing the amorphous polyamide resin may be a single amorphous polyamide resin or a polymer alloy of an amorphous polyamide resin containing a polyamide resin, a polyolefin resin, a polystyrene resin, a thermoplastic elastomer, a rubber component, or the like as long as the transparency is not impaired.

Examples of kinds of the amorphous polyamide resin include polyamide PA12/MACMI (PA12/3,3-dimethyl-4,4-diaminocyclohexylmethane, isophthalic acid), PA12/MACMT (PA12/3,3-dimethyl-4,4-diaminocyclohexylmethane, terephthalic acid), PA MACM 12 (3,3-dimethyl-4,4-diaminocyclohexylmethane, decane dicarboxylic acid or laurolactam), PA MC 12 (PA12, 1,3-bis(aminomethyl)cyclohexane), PA6I/6T, and PA6I/6T/MACMI. It should be noted that the notations of the polyamide resins are in accordance with JIS K6920-1.

In the present invention, as a resin component containing an amorphous polyamide resin, there may be used those available in the market such as "Grilamide TR55" containing PA12/MACMI (trade name, manufactured by EMS-Chemie), "Grilamide TR90" containing PA MACM 12 (trade name, manufactured by EMS-Chemie), and "Trogamide CX" (trade name, manufactured by Evonik Degussa-Chemie) containing PA MC 12, and "CRISTAMID MS" containing PA12/MACMT (trade name, manufactured by ARKEMA).

The refractive indices of the resin component containing the amorphous polyamide resin is preferably: 1.505 to 1.545 with respect to light having a wavelength of 589 nm; 1.512 to 1.555 with respect to light having a wavelength of 486 nm; and 1.502 to 1.541 with respect to light having a wavelength of 656 nm. In particular, in order to decrease the differences of the refractive indices between the resin component and the glass filler, the refractive indices of the resin component containing the amorphous polyamide resin are particularly preferably: 1.508 to 1.520 with respect to light having a wavelength of 589 nm; 1.515 to 1.527 with respect to light having a wavelength of 486 nm; and 1.505 to 1.517 with respect to light having a wavelength of 656 nm. Preferred examples of the resin components having the above-mentioned refractive indices include "Grilamid TR90" (trade name, manufactured by EMS-CHEMIE, the refractive index with respect to light having a wavelength of 589 nm is 1.509, the refractive index with respect to light having a wavelength of 486 nm is 1.516, and the refractive index with respect to light having a wavelength of 656 nm is 1.506).

(Glass Filler)

The glass filler used in the amorphous polyamide resin composition of the present invention contains, expressed in terms of oxides by mass %, 68 to 74% of silicon dioxide ($SiO_2$), 2 to 5% of aluminum oxide ($Al_2O_3$), 2 to 5% of boron oxide ($B_2O_3$), 2 to 10% of calcium oxide (CaO), 0 to 5% of zinc oxide (ZnO), 0 to 5% of strontium oxide (SrO), 0 to 1% of barium oxide (BaO), 1 to 5% of magnesium oxide (MgO), 0 to 5% of lithium oxide ($Li_2O$), 5 to 12% of sodium oxide ($Na_2O$), and 0 to 10% of potassium oxide ($K_2O$), where a total amount of lithium oxide ($Li_2O$), sodium oxide ($Na_2O$), and potassium oxide ($K_2O$) is 8 to 12%.

Hereinafter, the composition of the glass filler of the present invention will be described ("mass %" is simply referred to as "%").

The glass filler should contain silicon dioxide ($SiO_2$) at a concentration of 68 to 74%, and preferably 68 to 72%. If the silicon dioxide ($SiO_2$) content is less than 68%, it is difficult to match the refractive index of the glass filler to that of the amorphous polyamide resin. On the other hand, if the silicon dioxide ($SiO_2$) content exceeds 74%, solubility of the glass filler in production thereof is lowered. In particular, in the case where the glass filler is used as a glass fiber, the spinning temperature is raised, resulting in difficulty in production.

The glass filler should contain aluminum oxide ($Al_2O_3$) at a concentration of 2 to 5%, and preferably 2 to 4%. If the aluminum oxide ($Al_2O_3$) content is less than 2%, chemical resistance such as water resistance is lowered. On the other hand, if the aluminum oxide ($Al_2O_3$) content exceeds 5%, the glass tends to be heterogeneous because of lowered solubility in production of the glass filler.

The total content of silicon dioxide ($SiO_2$) and aluminum oxide ($Al_2O_3$) is preferably 70 to 79%, and more preferably 71 to 76%. If the content is within the ranges, it is easy to approximate the refractive index of the glass filler to the refractive index of the amorphous polyamide resin.

The glass filler should contain sodium oxide ($Na_2O$) at a concentration of 5 to 12%, and preferably 8 to 11%. If the sodium oxide ($Na_2O$) content exceeds 12%, water resistance of the glass tends to decrease. On the other hand, if the sodium oxide ($Na_2O$) content is less than 5%, it is difficult to approximate the refractive index of the glass filler to the refractive index of the amorphous polyamide resin.

The glass filler may contain lithium oxide ($Li_2O$) at a concentration of 0 to 5%, and preferably 0 to 2%. Meanwhile, the glass filler may contain potassium oxide ($K_2O$) at a concentration of 0 to 10%, and preferably 0 to 5%. Sodium oxide ($Na_2O$) may partially be substituted by lithium oxide ($Li_2O$) or potassium oxide ($K_2O$), whereby it is possible to improve the water resistance of the glass.

The glass filler may contain such alkaline components, lithium oxide ($Li_2O$), sodium oxide ($Na_2O$), and potassium oxide ($K_2O$), at a concentration of 8 to 12%, and preferably 8 to 11% in total. If the total amount of the alkaline components exceeds 12%, water resistance of the glass tends to decrease. On the other hand, if the total amount of the alkaline components is less than 8%, it is difficult to produce the glass filler because the glass is difficult to melt due to lowered melt ability in production of the glass filler.

The glass filler should contain calcium oxide (CaO) at a concentration of 2 to 10%, and preferably 6 to 9%. If the calcium oxide (CaO) content is less than 2%, the meltability as glass tends to be lowered. On the other hand, if the calcium oxide (CaO) content exceeds 10%, it is difficult to approximate the refractive index of the glass filler to the refractive index of the amorphous polyamide resin.

Zinc oxide (ZnO) is an optional component, and the glass filler may contain zinc oxide at a concentration of 0 to 5%, preferably 0 to 2%. Addition of zinc oxide (ZnO) may improve the water resistance of the glass. However, the zinc oxide (ZnO) content exceeding the upper limit is not preferred because the glass tends to be led to devitrification.

Strontium oxide (SrO) is an optional component, and the glass filler may contain strontium oxide at a concentration of 0 to 5%, and preferably 0 to 2%.

Barium oxide (BaO) is an optional component, and the glass filler may contain barium oxide at a concentration of 0 to 1%.

The total content of calcium oxide (CaO), zinc oxide (ZnO), strontium oxide (SrO), and barium oxide (BaO) is preferably 4 to 10%, and more preferably 6 to 10%. If the total content of the components is less than 4%, the meltability as glass may be lowered. On the other hand, if the content exceeds 10%, it is difficult to approximate the refractive index of the glass filler to the refractive index of the amorphous polyamide resin.

The glass filler should contain magnesium oxide (MgO) at a concentration of 1 to 5%, and preferably 1 to 3%. Addition of magnesium oxide (MgO) can improve mechanical properties as glass. The magnesium oxide (MgO) content exceeding 5% is not preferred because the melt ability as glass tends to be lowered.

The glass filler should contain boron oxide ($B_2O_3$) at a concentration of 2 to 5%, and preferably 2 to 4%. The boron oxide ($B_2O_3$) content of less than 2% is not preferred because it is difficult to approximate the refractive index of the glass filler to the refractive index of the amorphous polyamide resin. The boron oxide ($B_2O_3$) content exceeding 5% is not preferred because volatilization tends to occur during glass melting, which may increase corrosion of facilities for production due to volatile components or may require the equipment for collecting the volatile components.

The glass filler of the present invention, when containing titanium oxide ($TiO_2$), is colored brown, and the obtained molded product thereof is colored yellow. Therefore, the glass filler containing titanium oxide is difficult to use especially when the color tone of the molded product is of concern. Accordingly, the glass filler is preferably substantially free from titanium oxide ($TiO_2$). The phrase "the glass filler is substantially free from titanium oxide" means that the glass filler is intentionally free from titanium oxide except when the filler contains titanium oxide as impurities from industrial materials, i.e., the $TiO_2$ content is less than 0.1%.

The glass filler of the present invention may contain a component other than the above-mentioned components as long as the effect of the present invention is not impaired. For example, the glass filler may contain an oxide of a metal such as Fe, Co, Ni, Sn, Zr, or Mo as a component of the glass composition.

The glass filler having the above-mentioned composition has a refractive index of 1.505 to 1.545 with respect to light having a wavelength of 589 nm, a refractive index of 1.512 to 1.555 with respect to light having a wavelength of 486 nm, and a refractive index of 1.502 to 1.541 with respect to light having a wavelength of 656 nm, and the refractive indices are almost the same as those of amorphous polyamide resins. Therefore, the glass filler can be used for producing an amorphous polyamide resin molded product having high transparency and excellent mechanical strength. In addition, the melting temperature of glass is 1,500 to 1,600° C., and therefore the glass filler can be formed into a fibrous shape as the case of the E-glass composition.

For example, if the glass filler contains 68 to 72% of silicon dioxide ($SiO_2$), 2 to 4% of aluminum oxide ($Al_2O_3$), 2 to 4% of boron oxide ($B_2O_3$), 6 to 9% of calcium oxide (CaO), 0 to 2% of zinc oxide (ZnO), 0 to 2% of strontium oxide (SrO), 0 to 1% of barium oxide (BaO), 1 to 3% of magnesium oxide (MgO), 0 to 2% of lithium oxide ($Li_2O$), 8 to 11% of sodium oxide ($Na_2O$), and 0 to 5% of potassium oxide ($K_2O$), the glass filler tends to have a refractive index of 1.508 to 1.520 with respect to light having a wavelength of 589 nm, a refractive index of 1.515 to 1.527 with respect to light having a wavelength of 486 nm, and a refractive index of 1.505 to 1.517 with respect to light having a wavelength of 656 nm.

As described above, silicon dioxide ($SiO_2$), aluminum oxide ($Al_2O_3$), and alkaline components can decrease the refractive index of the glass filler, and examples of a component that can decrease the refractive index of glass filler other than the above-mentioned components include $P_2O_5$ and $F_2$.

Therefore, in the case where the refractive index of the glass filler is smaller than a desired refractive index, that is, the refractive index of the amorphous polyamide resin, the refractive index can be raised by, for example, substituting calcium oxide (CaO) for part of the silicon dioxide ($SiO_2$) content. Specifically, for example, if 0.4% of calcium oxide (CaO) is substituted for 0.4% of silicon dioxide ($SiO_2$), the refractive index of the glass filler increases by about 0.002.

In the case where the refractive index of the glass filler is larger than a desired refractive index, that is, the refractive index of the amorphous polyamide resin, the refractive index can be lowered by, for example, substituting an alkaline component for part of calcium oxide (CaO) content. Specifically, for example, if 0.8% of sodium oxide ($Na_2O$) is substituted for 0.5% of calcium oxide (CaO), the refractive index of the glass filler decreases by about 0.002.

As described, if a component capable of raising the refractive index of the glass filler and a component capable of lowering the refractive index of the glass filler are separately and appropriately substituted without departing from the scope of the present invention, the refractive index of the glass filler can be appropriately adjusted, and it is possible to produce a glass filler having the same range of refractive index as the refractive index of the amorphous polyamide resin.

In the present invention, the glass filler may be used as a glass fiber, glass powder, glass flake, milled fiber, or glass bead. Among them, the glass filler is preferably used as a glass fiber because the glass fiber has spinning property, mechanical strength, and the like equivalent to those of a conventional reinforcing fiber such as E-glass fiber and has a high efficiency in reinforcing the amorphous polyamide resin molded product.

The glass fiber can be produced by a conventionally known spinning method for a continuous glass fiber. For example, it is possible to fibrillate the glass by various methods such as the direct melt (DM) method in which a glass raw material is subjected to vitrification continuously in a melting furnace and then introduced to a forehearth, followed by spinning by a bushing mounted at the bottom of the forehearth, and the re-melting method in which molten glass is formed into a marble, cullet, or rod shape, followed by re-melting and spinning.

The diameter of the glass fiber is not particularly limited, but the diameter is preferably 5 to 50 µm. If the diameter is smaller than 5 µm, the contact area of the glass fiber and the resin is increased to cause irregular reflection, whereby the transparency of the molded product may be deteriorated. If the diameter is larger than 50 µm, the strength of the glass fiber tends to be weak, with the result that the strength of the molded product may be deteriorated. The diameter is more preferably 10 to 45 µm.

The glass powder can be produced by a conventionally known production method. For example, powders each having a desired particle size can be produced by a method in which a glass raw material is melted in a melting furnace and put into water to perform water granulation or a method in which a glass raw material is melted in a melting furnace and the resultant melt is molded into a sheet on a cooling roll, followed by pulverization of the sheet. The particle size of the glass powder is not particularly limited, but the particle size is preferably 1 to 100 µm.

The glass flake can be produced by a conventionally known production method. For example, flakes each having a desired aspect ratio can be produced by melting a glass raw material in a melting furnace, spinning the resultant melt into a tube shape, adjusting the thickness of the glass to a certain value, pulverizing the melt on a roll to prepare a frit having a specific thickness, and pulverizing the frit. The thickness and aspect ratio of the glass flake are not particularly limited but are preferably 0.1 to 10 µm and 5 to 150, respectively.

The milled fiber can be produced by a conventionally known production method for a milled fiber. For example, a milled fiber can be produced by pulverizing a strand of a glass fiber using a hammer mill or a ball mill. The fiber diameter and aspect ratio of the milled fiber are not particularly limited, but are preferably 5 to 50 µm and 2 to 150, respectively.

The glass bead can be produced by a conventionally known production method. For example, a glass bead having a desired particle size can be produced by melting a glass raw material in a melting furnace and spraying the melt by a burner. The particle size of glass beads is not particularly limited, but is preferably 5 to 300 µm.

In the present invention, two or more selected from the group consisting of the glass fiber, glass powder, glass flake, milled fiber, and glass bead may be used in combination as a glass filler.

It is preferred that the glass filler be surface-treated with a treatment containing a coupling agent to increase the affinity and the adhesiveness between the resin component containing the amorphous polyamide resin and the glass fiber, thereby to suppress the decrease in transparency of the molded product due to formation of voids.

As the coupling agent, silane coupling agents, borane coupling agents, aluminate coupling agents, titanate coupling agents, and the like may be used. In particular, because good adhesiveness between the amorphous polyamide resin and a glass filler can be obtained, silane coupling agents are preferred. As the silane coupling agent, aminosilane coupling agents, epoxysilane coupling agents, acrylsilane agents, and the like may be used. Of those silane coupling agents, aminosilane coupling agents are most preferred.

In addition, as a component other than the coupling agent, which is contained in the treatment, film formers, lubricating agents, antistatic agents, and the like are given. Those components may be used singly, or plurality of components may be used in combination. As the film former, a vinyl acetate resin, a urethane resin, an acrylic resin, a polyester resin, a polyether resin, a phenoxy resin, a polyamide resin, an epoxy resin, or the like may be used. As the lubricating agent, an aliphatic ester, aliphatic ether, aromatic ester, or aromatic ether surfactants may be used. As the antistatic agent, an inorganic salt such as lithium chloride or potassium iodide, as well as a quaternary ammonium salt such as an ammonium chloride type or an ammonium ethosulfate type salt, may be used.

In the present invention, the glass filler content in the amorphous polyamide resin composition is preferably 5 to 40 mass %, and more preferably 5 to 20 mass %. If the glass filler content is less than 5 mass %, the molded product obtained by molding the amorphous polyamide resin composition tends to have low mechanical properties, while if the glass filler content exceeds 40 mass %, the contact area of the resin and the glass filler is increased, which tends to lower transparency of the molded product obtained by molding the amorphous polyamide resin composition and tends to lower moldability. When the amount of the glass filler in the amorphous polyamide resin composition is within the above-mentioned range, it is possible to produce a molded product having both high mechanical properties and excellent transparency. The molded product is useful as a molded product which is required to have high mechanical properties.

(Other Components)

The amorphous polyamide resin composition of the present invention further include a coupling agent. As the coupling agent, as in the case of coupling agent contained in the treatment of the glass filler, a silane coupling agent, a borane coupling agent, an aluminate coupling agent, or a titanate coupling agent may be used. Of those, because good adhesiveness between the amorphous polyamide resin and the glass filler can be obtained, a silane coupling agent is preferred.

The amorphous polyamide resin composition of the present invention may contain an other known additive as long as the properties such as transparency are not impaired. For example, an antioxidant can suppress decomposition and coloring of the resin at the time of production or molding of the amorphous polyamide resin composition. In addition, if a colorant is used, it is possible to produce a colored transparent molded product.

(Production Method of Amorphous Polyamide Resin Composition)

The amorphous polyamide resin composition of the present invention can be produced by a known method. For example, the melt-kneading method, pultrusion molding method, and the like are preferably used.

The melt-kneading method is a method in which a molten resin, glass filler, and optional additive are kneaded in an extruder. The melt-kneading method includes: a method including melting a resin in a twin screw extruder and feeding a glass filler from a feeding port (side-feed method); and a method in which a pre-blended mixture of resin, a glass filler, and an optional additive is melt-kneaded in a twin or single screw extruder (premix method). In the side-feed method, the optional additive may be preliminarily mixed with a resin or may be preliminarily mixed with a glass filler depending on characteristics of the additive. Moreover, in order to suppress decomposition or coloring due to air-oxidation, an opening and a material-feeding port in the extruder may be set to a nitrogen atmosphere.

The pultrusion molding method is preferably employed for a case where the glass filler is in the form of continuous glass fiber and a molded product produced is required to have higher mechanical strength. The pultrusion molding method is a method in which a resin to be used a matrix is impregnated in a consecutive continuous glass fiber bundle while the bundle being stretched. Examples of the method include: a method including impregnating a resin by passing a fiber bundle through an impregnation bath filled with a matrix resin solution; a method including impregnating a molten matrix resin in a fiber bundle after attaching a matrix resin powder to a fiber bundle by spraying the matrix resin powder to the fiber bundle or by passing the fiber bundle through a bath filled with the powder; and a method including impregnating a matrix resin in a fiber bundle by supplying the resin to a crosshead from an extruder or the like while passing the fiber bundle through the crosshead. Of those, the method using a crosshead is preferable.

(Amorphous Polyamide Resin Molded Product)

The amorphous polyamide resin molded product of the present invention can be produced by a known method in which the amorphous polyamide resin composition of the present invention is molded by, for example, an injection molding, an extrusion molding, a compression molding, a calendar molding, or the like. Alternatively, at the time of molding, molding may be performed using a mold, the inside of which is covered with a resin film or a resin sheet.

The thickness of the molded product may be arbitrary. In particular, in the case of a molded product required to have transparency, the thickness should be adjusted to 0.1 to 5 mm, and more preferably 0.2 to 2 mm. If the thickness of the molded product is less than 0.1 mm, the molded product warps easily and has low mechanical strength, which causes a difficulty in molding. On the other hand, if the thickness of the molded product exceeds 5 mm, transparency is impaired.

In addition, a coating such as a hard coat film, antifog film, antistatic film, or antireflective film is preferably formed on the molded product. The coating may be a complex coating including two or more of the films. The surface of the molded product is particularly preferably coated with a hard coat film because the coating performs weather resistance and can prevent chronologic abrasion on the surface of the molded product. The material of the hard coating is not particularly limited, and a known material such as an acrylate hard coating, silicone hard coating, and inorganic hard coating may be used.

Although production conditions of the amorphous polyamide resin composition and molding conditions of the amorphous polyamide resin molded product may be appropriately selected and are not particularly limited, the heating temperature at the time of melt-kneading, as well as the resin temperature at the time of injection molding, is preferably appropriately selected from the range of generally 220° C. to 300° C., whereby decomposition of the resin is suppressed.

If the glass filler is present on the outermost surface of the molded product, the surface roughness of the product becomes larger, which may increase irregular reflection on the surface of the molded product, possibly resulting in deteriorating transparency of the molded product. Therefore, in order to improve the transparency of the molded product, there may be employed a method including decreasing the surface roughness of the molded product by forming a layer containing a resin at a high ratio (skin layer) on the outermost surface of the molded product. In order to form the skin layer, in the case of the injection molding, the temperature of a mold may be adjusted to a temperature higher than that of general conditions (equal to or higher than a deflection temperature under load of a material). This method can improve fluidity of the resin in contact with the mold to form the skin layer of the outermost surface of the molded product, which may decrease the surface roughness of the molded product. In order to prevent a suppression of flux of a molten resin caused by rapid cooling, when injected in a mold, the inner surface of the mold may be coated with a resin, or a sheet previously molded so as to follow the mold may be included (film-insert molding), or a continuous film may be attached to the surface of the mold before molding (film-in molding). If the surface roughness decreases by forming a skin layer on the outermost surface of a molded product through the above-mentioned methods, irregular reflection decreases on the surface of the molded product to reduce the haze, whereby it is possible to improve the transparency of the molded product.

In the case where the amorphous polyamide resin molded product of the present invention produced as described above is molded into a plate, the molded product should have a parallel light transmittance with respect to visible light of 65% or more and a haze of less than 25%. The parallel light transmittance is preferably 70% or more. The haze is preferably 15% or less. The amorphous polyamide resin molded product having such optical properties is excellent in transparency and is useful as a molded product which is required to have high transparency. Note that the parallel light transmittance to visible light is measured in accordance with JIS-K7105. The haze is measured in accordance with JIS-K7136.

The amorphous polyamide resin molded product of the present invention can be suitably used for a part which is required to have mechanical properties and heat resistance as well as transparency. Examples of the part include: 1) optical materials such as optical lenses, optical mirrors, prisms, and diffuser plates and materials of electronic/electrical parts; and 2) medical device parts such as chemical liquid containers for injection, vials, ampules, pre-filled syringes, infusion bags, drug containers, and medical sample containers. In the field where the amorphous polyamide resin molded product has been used, the molded product can be suitably used for a part which is required to have tap-strength and tightening-strength of torque for the molded product. In addition, the molded product can be suitably used for a part which is used for discriminating the inside of the molded product, such as outer panels, housings, and opening materials. Specific examples thereof include: 3) parts for precision equipment such as cases and covers for mobile telephones, PDAs, cameras, slide projectors, watches, calculators, measuring equipment, and display equipment; 4) parts for electrical equipment such as various parts of televisions, radio cassettes, video cameras, video tape recorders, audio players, DVD players, telephones, displays, computers, cash registers, copiers, printers, fax machines, and such as respective parts of outer panels and housings; 5) automotive parts such as sunroofs, door visors, rear windows, and side windows; 6) architectural parts such as architectural glasses, soundproof walls, carports, sunrooms, and gratings; 7) furniture parts such as lamp covers, blinds, and interior equipment; and 8) others. The molded product can be suitably used in these.

EXAMPLES

Hereinafter, the present invention will be described in detail by way of examples. However, these examples are intended to describe embodiments of the present invention in detail and are not construed to limit the scope of the present invention.

(Production of Glass Fiber)

Glass fibers according to Production Examples 1 to 3 were prepared with compositions (mass %) shown in Table 1.

The glass fiber was spun to have a fiber diameter of 15 μm by a conventional method, and as a binder, aminosilane and urethane were added thereto so as to be 0.5 mass %. Table 1 shows the compositions of the glass fibers, and refractive indices with respect to light having a wavelength of 589 nm (hereinafter, referred to as nD), with respect to light having a wavelength of 486 nm (hereinafter, referred to as nF), and with respect to light having a wavelength of 656 nm (hereinafter, referred to as nC). The refractive indices were measured by the immersion liquid method by B method disclosed in JIS-K7142.

TABLE 1

|  | Production Example 1 | Production Example 2 | Production Example 3 |
|---|---|---|---|
| mass % | | | |
| SiO$_2$ | 71.0 | 69.5 | 55.1 |
| Al$_2$O$_3$ | 4.0 | 4.0 | 14.0 |
| B$_2$O$_3$ | 4.0 | 4.0 | 6.0 |
| CaO | 7.1 | 8.5 | 23.0 |
| ZnO$_2$ | | 1.0 | |
| MgO | 3.0 | 3.0 | 0.4 |
| Na$_2$O | 10.9 | 8.0 | 0.6 |
| K$_2$O | | 2.0 | 0.1 |
| LiO$_2$ | | | |
| Fe$_2$O$_3$ | | | 0.2 |
| F$_2$ | | | 0.6 |
| Refractive index | | | |
| nF | 1.515 | 1.522 | 1.563 |
| nD | 1.509 | 1.516 | 1.556 |
| nC | 1.507 | 1.513 | 1.553 |

(Production of Molded Product of Glass Fiber-Reinforced Amorphous Polyamide Resin)

The glass fiber of Production Example 1 was used as a glass filler to perform compounding under the following conditions, whereby glass fiber-reinforced amorphous polyamide resin molded products of Examples 1 and 2 were obtained. Meanwhile, the glass fiber of Production Example 3 (which is E-glass composition) was used as a glass filler in the same way as in Examples 1 and 2, whereby glass fiber-reinforced amorphous polyamide resin molded products of Comparative Examples 1 and 2 were produced.

(Amorphous Polyamide Resin Used)

Amorphous polyamide resin: Grilamid TR90 (manufactured by EMS-Chemie, nD=1.509, nF=1.516, nC=1.506)

(Compounding Conditions)

Glass fiber: a chopped strand having a diameter of 15 μm and a length of 3 mm, number of filaments in strand: 400

Extruder: TEM-35B (manufactured by TOSHIBA MACHINE CO., LTD.)

Extrusion temperature: 280° C.

Glass content: 10 mass %, 20 mass %

(Injection Conditions)

Molding machine: IS-80G (manufactured by TOSHIBA MACHINE CO., LTD.)

Cylinder temperature: 280° C.

Mold temperature: 130° C.

Table 2 shows the optical properties and mechanical properties of the above-mentioned amorphous polyamide resin molded products. The parallel light transmittance, one of the optical properties, was measured in accordance with JIS-K7105 for a sample with a thickness of 2 mm using an NDH sensor manufactured by Nippon Denshoku Industries Co., Ltd. The haze value was measured according to JIS-K7136 for a sample with a thickness of 2 mm using an NDH sensor manufactured by Nippon Denshoku Industries Co., Ltd. The mechanical properties were measured for a sample with a thickness of 3 mm, while the flexural strength and the flexural modulus were measured in accordance with ASTM D-790. The tensile strength was measured in accordance with ASTM D-638. The deflection temperature under load (hereinafter, referred to as DTUL), which is an index of heat-resistant, was measured in accordance with ASTM-D648.

In Examples 1 and 2, the difference of the refractive indices between the glass fiber of Production Example 1 and the amorphous polyamide resin with respect to light having a wavelength of 589 nm, light having a wavelength of 486 nm, and light having a wavelength of 656 nm each were found to be 0.002 or less.

On the other hand, in Comparative Examples 1 and 2, the difference of the refractive indices between the glass fiber of Production Example 3 and the amorphous polyamide resin with respect to light having a wavelength of 589 nm, light having a wavelength of 486 nm, and light having a wavelength of 656 nm each were found to be 0.047, respectively.

TABLE 2

| | | Test method | Unit | Reference Example | Example 1 | Example 2 | Comparative Example 1 | Comparative Example 2 |
|---|---|---|---|---|---|---|---|---|
| | Glass fiber | | | | Production Example 1 | Production Example 1 | Production Example 3 | Production Example 3 |
| Differences of | Wavelength 486 nm | | | | 0.001 | 0.001 | 0.047 | 0.047 |

TABLE 2-continued

|  |  | Test method | Unit | Reference Example | Example 1 | Example 2 | Comparative Example 1 | Comparative Example 2 |
|---|---|---|---|---|---|---|---|---|
| refractive indices between resin and glass fiber | Wavelength 589 nm |  |  |  | 0.000 | 0.000 | 0.047 | 0.047 |
|  | Wavelength 656 nm |  |  |  | 0.001 | 0.001 | 0.047 | 0.047 |
|  | Glass content | — | % | 0 | 10 | 20 | 10 | 20 |
| Optical properties (Thickness 2 mm) | Haze | JIS K 7136 | % | 1.3 | 7.9 | 20.3 | 95.0 | 98.9 |
|  | Parallel light transmittance | JIS K 7105 | % | 90.8 | 83.5 | 71.2 | 3.5 | 2.8 |
| Mechanical properties (Thickness 3 mm) | Tensile strength | ASTM D-638 | MPa | 56 | 67 | 91 | 68 | 93 |
|  | Flexural strength | ASTM D-790 | MPa | 83 | 100 | 138 | 99 | 140 |
|  | Flexural modulus | ASTM D-790 | MPa | 1,570 | 2,280 | 3,580 | 2,190 | 3,560 |
|  | DTUL 1.81 MPa | ASTM D-648 | ° C. | 120 | 136 | 142 | 135 | 143 |

The results described in Table 2 show the followings. Comparing the molded products of Examples 1 and 2 with the molded products of Comparative Examples 1 and 2, the molded products of Examples have mechanical properties equivalent to those of the molded products of Comparative Examples, have hazes lower than those of the molded products of Comparative Examples, have higher parallel light transmittances than those of the molded products of Comparative Examples, and have improved transparency.

The amorphous polyamide resin composition of the present invention and the amorphous polyamide resin molded product using the composition can be suitably used for a molded product required to have both properties of transparency and strength.

What is claimed is:

1. An amorphous polyamide resin composition comprising:
   a resin component containing an amorphous polyamide resin; and
   a glass filler, wherein the glass filler contains, expressed in terms of oxides by mass %, 68 to 74% of silicon dioxide ($SiO_2$), 2 to 5% of aluminum oxide ($Al_2O_3$), 2 to 5% of boron oxide ($B_2O_3$), 7.1 to 10% of calcium oxide (CaO), 0 to 5% of zinc oxide (ZnO), 0 to 5% of strontium oxide (SrO), 0 to 1% of barium oxide (BaO), 1 to 5% of magnesium oxide (MgO), 0 to 2% of lithium oxide ($Li_2O$), 8 to 11% of sodium oxide ($Na_2O$), and 0 to 10% of potassium oxide ($K_2O$), where a total amount of lithium oxide ($Li_2O$), sodium oxide ($Na_2O$), and potassium oxide ($K_2O$) is 8 to 12%; and
   the refractive indices of the resin component containing the amorphous polyamide resin are 1.508 to 1.520 with respect to light having a wavelength of 589 nm; 1.515 to 1.527 with respect to light having a wavelength of 486 nm; and 1.505 to 1.517 with respect to light having a wavelength of 656 nm;
   the differences of refractive indices between the glass filler and the resin component are: 0.002 or less with respect to light having a wavelength of 589 nm; 0.002 or less with respect to light having a wavelength of 486 nm; and 0.002 or less with respect to light having a wavelength of 656 nm; and
   the amorphous polyamide resin composition has a parallel light transmittance of 65% or more and a haze of less than 25% when the composition is molded into a plate having a thickness of 2 mm.

2. An amorphous polyamide resin composition according to claim 1, wherein the glass filler has a total content of calcium oxide (CeO) and magnesium oxide (MgO) of 8.1 to 15% expressed in terms of oxides by mass %.

3. An amorphous polyamide resin composition according to claim 1, wherein the glass filler has a total content of silicon dioxide ($SiO_2$) and aluminum oxide ($Al_2O_3$) of 70 to 79% expressed in terms of oxides by mass %.

4. An amorphous polyamide resin composition according to claim 1, wherein the glass filler is substantially free from titanium oxide ($TiO_2$).

5. An amorphous polyamide resin composition according to claim 1, wherein the amorphous polyamide resin composition has a content of the glass filler of 5 to 40 mass %.

6. An amorphous polyamide resin composition according to claim 1, wherein the glass filler comprises at least one selected from the group consisting of a glass fiber, a glass powder, a glass flake, a milled fiber, and a glass bead.

7. An amorphous polyamide resin molded product, which is produced by molding an amorphous polyamide resin composition including: a resin component containing an amorphous polyamide resin; and a glass filler containing, expressed in terms of oxides by mass %, 68 to 74% of silicon dioxide ($SiO_2$), 2 to 5% of aluminum oxide ($Al_2O_3$), 2 to 5% of boron oxide ($B_2O_3$), 7.1 to 10% of calcium oxide (CaO), 0 to 5% of zinc oxide (ZnO), 0 to 5% of strontium oxide (SrO), 0 to 1% of barium oxide (BaO), 1 to 5% of magnesium oxide (MgO), 0 to 2% of lithium oxide ($Li_2O$), 8 to 11% of sodium oxide ($Na_2O$), and 0 to 10% of potassium oxide ($K_2O$), where a total amount of lithium oxide ($Li_2O$), sodium oxide ($Na_2O$), and potassium oxide ($K_2O$) is 8 to 12%; and
   the refractive indices of the resin component containing the amorphous polyamide resin are 1.508 to 1.520 with respect to light having a wavelength of 589 nm; 1.515 to 1.527 with respect to light having a wavelength of 486 nm; and 1.505 to 1.517 with respect to light having a wavelength of 656 nm;
   the differences of refractive indices between the glass filler and the resin component are: 0.002 or less with respect to light having a wavelength of 589 nm; 0.002 or less with respect to light having a wavelength of 486 nm; and 0.002 or less with respect to light having a wavelength of 656 nm; and
   the amorphous polyamide resin composition has a parallel light transmittance of 65% or more and a haze of less than 25% when the composition is molded into a plate having a thickness of 2 mm.

8. An amorphous polyamide resin molded product according to claim 7, wherein the glass filler has a total content of calcium oxide (CaO) and magnesium oxide (MgO) of 8.1 to 15% expressed in terms of oxides by mass %.

9. An amorphous polyamide resin molded product according to claim 7, wherein the glass filler has a total content of silicon dioxide ($SiO_2$) and aluminum oxide ($Al_2O_3$) of 70 to 79% expressed in terms of oxides by mass %.

10. An amorphous polyamide resin molded product according to claim 7, wherein the glass filler is substantially free from titanium oxide ($TiO_2$).

11. An amorphous polyamide resin molded product according to claim 7, wherein the amorphous polyamide resin composition has a content of the glass filler of 5 to 40 mass %.

12. An amorphous polyamide resin molded product according to claim 7, wherein the glass filler comprises at least one selected from the group consisting of a glass fiber, a glass powder, a glass flake, a milled fiber, and a glass bead.

* * * * *